Aug. 31, 1954     B. W. BELL ET AL     2,687,918
MERCURY AUTOMATIC WHEEL BALANCER
Filed July 14, 1952
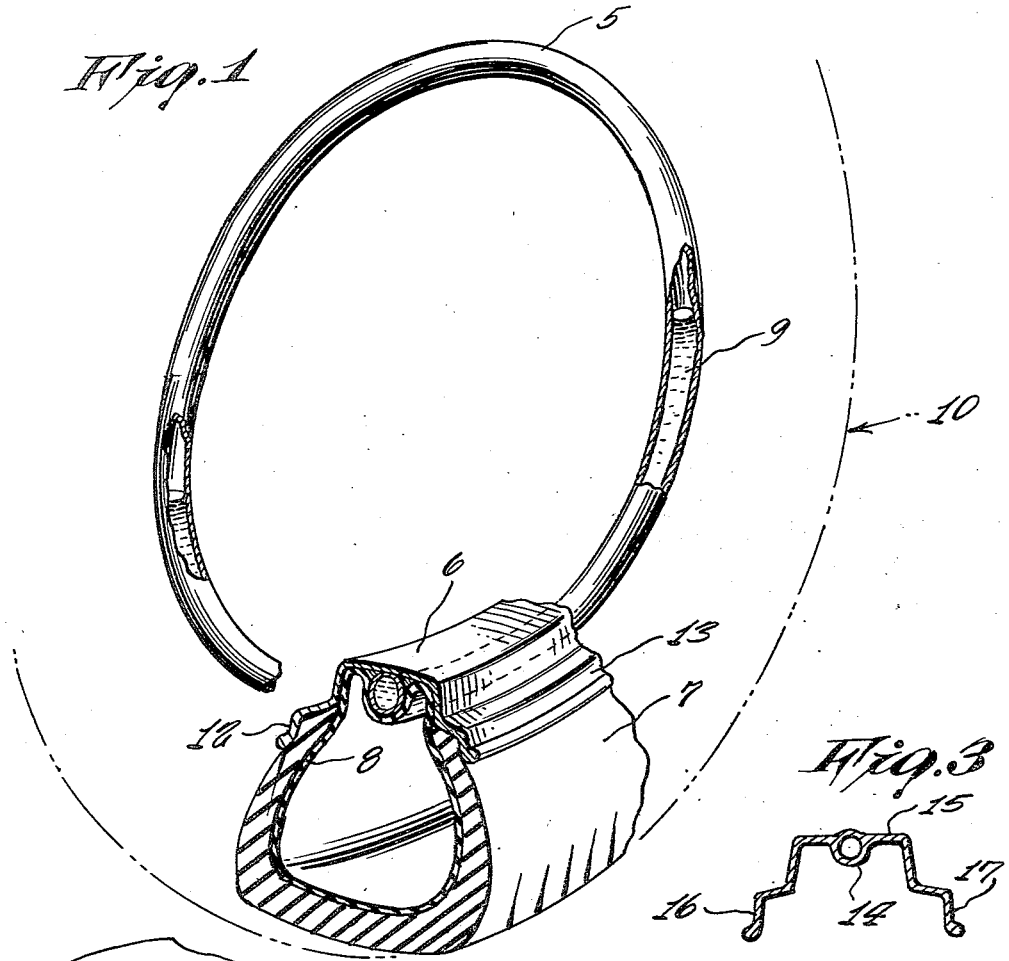
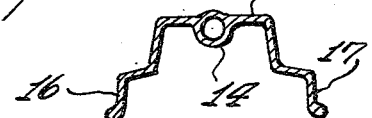
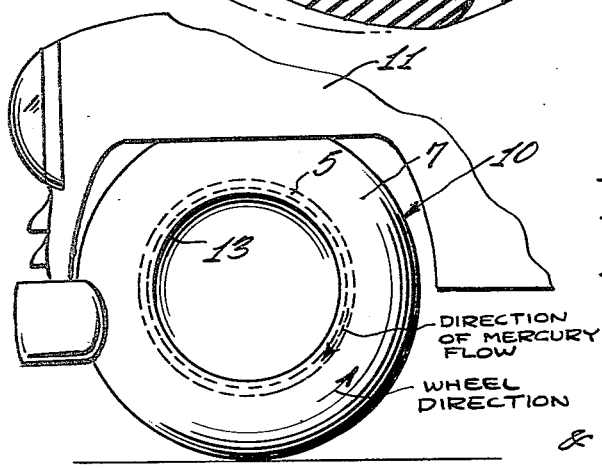
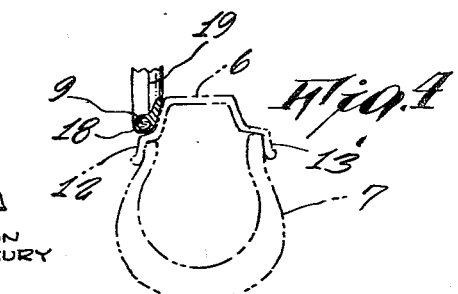
INVENTORS
BELMONT W. BELL
& MARGARET A. BELL
BY
Carl Miller
ATTORNEY

UNITED STATES PATENT OFFICE 2,687,918

MERCURY AUTOMATIC WHEEL BALANCER

Belmont W. Bell and Margaret A. Bell,
Mountainhome, Pa.

Application July 14, 1952, Serial No. 298,804

1 Claim. (Cl. 301—5)

This invention relates to a balancer for vehicle wheels having rubber tires and more particularly to a mercury automatic wheel balancer adapted to be connected to the vehicle wheel adjacent the rim thereof.

It is a principal object of the present invention to provide a mercury automatic wheel balancer which will effectively balance the vehicle wheel when in motion in an improved manner and which will replace the various balancing means now in use.

It is another object of the present invention to provide a mercury automatic wheel balancer which will effectively balance the vehicle wheel when in motion in an improved manner by a gyroscope-like action.

It is a still further object of the present invention to provide a mercury automatic wheel balancer which comprises a circular, hollow tube containing mercury adapted to be positioned between the rim of vehicle and the tire thereof.

Other objects of the present invention are to provide a mercury automatic wheel balancer which is of simple construction, inexpensive to manufacture, easy to connect to the wheel, compact, durable, will have long life and which is highly efficient in operation.

For other objects and for a better understanding of the invention, reference may be had to the following detailed description taken in connection with the accompanying drawing, in which Fig. 1 is a perspective view of a mercury automatic wheel balancer embodying the features of the present invention shown partly in cross section to show the mercury inside and showing the invention attached to a wheel;

Fig. 2 is a side elevational view showing the present invention in operative use on an automobile;

Fig. 3 is a vertical sectional view of a modified form of the present invention and Fig. 4 is a fragmentary front elevational view of a still further modified form of the present invention shown partly in cross section to show the interior construction thereof.

Referring now to the figures in detail and in the practice of our invention, there is shown a circular hollow tube of a non-amalgum forming metal 5 rigidly secured by welding or other suitable means to the felloe 6 of a conventional vehicle wheel on the side receiving the tire 7. As is shown in Fig. 1, the tube 5 is positioned between the felloe 6 and the inner tube 8 and will not in any way interfere with the removal and replacement of flat tires nor will it require an alteration in the structure of wheel felloes and wheels now in use.

Sealed within and half filling the tube 5 is a suitable quantity of mercury 9. The interior surface of the tube 5 should be perfectly smooth so as not to interfere with the motion of the mercury 9 when the vehicle wheel is in motion.

The felloe 6 is provided with the usual inner and outer rims 12 and 13 for fixedly engaging the tire 7.

Referring now particularly to Fig. 2, when the wheel, referred to collectively as 10, of automobile 11 is rotating about its true geometrical axis, the mercury 9 will be evenly distributed within the tube 5. When the rotating wheel is unbalanced, the mercury will take a position within the tube which will tend to correct the unbalanced condition of the wheel 10 in a surprisingly and remarkably efficient manner.

Referring now particularly to Fig. 3 and in further practice of our invention, there is shown a modified form of the present invention wherein a circular, hollow tube 14 adapted to contain the mercury 9 and having a smooth interior is integrally formed in the wheel felloe 15 having the usual inner and outer rims 16 and 17 for engaging a tire.

Referring now particularly to Fig. 4 and in further practice of our invention, there is shown a still modified form of the present invention wherein a circular, hollow tube 18 adapted to contain the mercury 9 and having a smooth interior is integrally formed around the periphery of a chrome ring 19 or hub-cap associated with conventional wheels now in use and which are adapted to nest in engagement with the wheels within the outer rims 12 thereof.

The principle of operation of this form of the invention is the same as the form shown in Figs. 1 and 2 and has the advantage that the tube 5 is more readily accessible and the invention may, by replacing chrome rings or hub-caps now in use by the one shown in Fig. 4, be readily adapted to wheels now in use or in production with a minimum of cost and labor.

It should now be apparent that there has been provided an improved mercury automatic wheel balancer adapted to be easily installed adjacent the rims of the wheel which will efficiently balance the wheel when in motion by a gyroscope-like action and which is of a simplified construction and inexpensive to manufacture, being readily adapted to mass production techniques currently employed in the auto industry.

While various changes may be made in the detailed construction, it shall be understood that such changes shall be within the spirit and scope of the invention as defined by the appended claim.

Having thus set forth and disclosed the nature of our invention, what is claimed is:

In a vehicle wheel, an annular rim adapted to receive a tire, one portion of the said rim integrally forming an annular tube and mercury disposed in the said tube and filling substantially half of the volume of the said tube, in which the said integrally formed annular tube is disposed along the median axis of the said rim and projects from the outer periphery of the said rim, so that the annular tube extends toward the said tire when mounted on the said rim.

References Cited in the file of this patent

UNITED STATES PATENTS

| Number | Name | Date |
|---|---|---|
| 1,209,730 | Leblanc | Dec. 26, 1916 |
| 1,314,005 | Louden | Aug. 26, 1919 |
| 2,029,132 | Skelton | Jan. 28, 1936 |
| 2,525,781 | De Remer | Oct. 17, 1950 |
| 2,576,105 | Childs | Nov. 27, 1951 |

FOREIGN PATENTS

| Number | Country | Date |
|---|---|---|
| 627,995 | France | June 20, 1927 |